United States Patent
Park et al.

(10) Patent No.: US 7,444,447 B2
(45) Date of Patent: Oct. 28, 2008

(54) ARRANGEMENT, DEVICE AND METHOD FOR CONTROLLING BUS REQUEST SIGNAL GENERATION

(75) Inventors: Chang-Dae Park, Suwon-si (KR); Ki-Chul Nam, Seoul (KR); Sung-Kwon Lee, Suwon-si (KR)

(73) Assignee: Samsung Electronics Co., Ltd., Suwon-Si, Gyeonggi do (KR)

( * ) Notice: Subject to any disclaimer, the term of this patent is extended or adjusted under 35 U.S.C. 154(b) by 267 days.

(21) Appl. No.: 11/043,947

(22) Filed: Jan. 28, 2005

(65) Prior Publication Data

US 2005/0188138 A1  Aug. 25, 2005

(30) Foreign Application Priority Data

Jan. 30, 2004 (KR) .................... 10-2004-0006295

(51) Int. Cl.
*G06F 13/36* (2006.01)
(52) U.S. Cl. ...................................... 710/113; 710/29
(58) Field of Classification Search ......... 710/110–119, 710/240–244, 309–312, 29–30
See application file for complete search history.

(56) References Cited

U.S. PATENT DOCUMENTS

| | | | | | |
|---|---|---|---|---|---|
| 5,560,016 | A | * | 9/1996 | Fiebrich et al. ............. | 710/240 |
| 5,623,672 | A | * | 4/1997 | Popat ......................... | 710/240 |
| 5,778,200 | A | * | 7/1998 | Gulick ........................ | 710/113 |
| 5,867,670 | A | * | 2/1999 | Kim et al. ................... | 710/113 |
| 5,956,493 | A | * | 9/1999 | Hewitt et al. ................ | 710/113 |
| 5,996,037 | A | * | 11/1999 | Emnett ....................... | 710/117 |
| 6,810,455 | B2 | * | 10/2004 | Wyland ...................... | 710/113 |
| 6,813,673 | B2 | * | 11/2004 | Kotlowski et al. ........... | 710/305 |
| 7,028,121 | B2 | * | 4/2006 | Chae .......................... | 710/240 |

FOREIGN PATENT DOCUMENTS

| JP | 63-233455 A | 9/1988 |
|---|---|---|
| JP | 1-321545 A | 12/1989 |
| KR | 1998-024741 A | 7/1998 |

* cited by examiner

*Primary Examiner*—Raymond N Phan
(74) *Attorney, Agent, or Firm*—Harness, Dickey & Pierce, P.L.C.

(57) ABSTRACT

A device, arrangement and method may control bus request timing to disperse bus access timing, so that adverse effects of concentration-on-bus phenomenon may be avoided. The device may include a bus request signal generating circuit may generate a bus request signal under control of a counter, and a pulse signal generating circuit may generate a pulse signal as a function of a number of times the bus request signal generating circuit has generated a bus request signal and a first threshold value. The device may include a determining circuit and a control circuit. The determining circuit may generate a determination result representing whether a given process period for generating the bus request signal has ended as a function of the pulse signal. The control circuit may control the counter to adjust the process period for generating the bus request signal, based on the determination result.

28 Claims, 3 Drawing Sheets

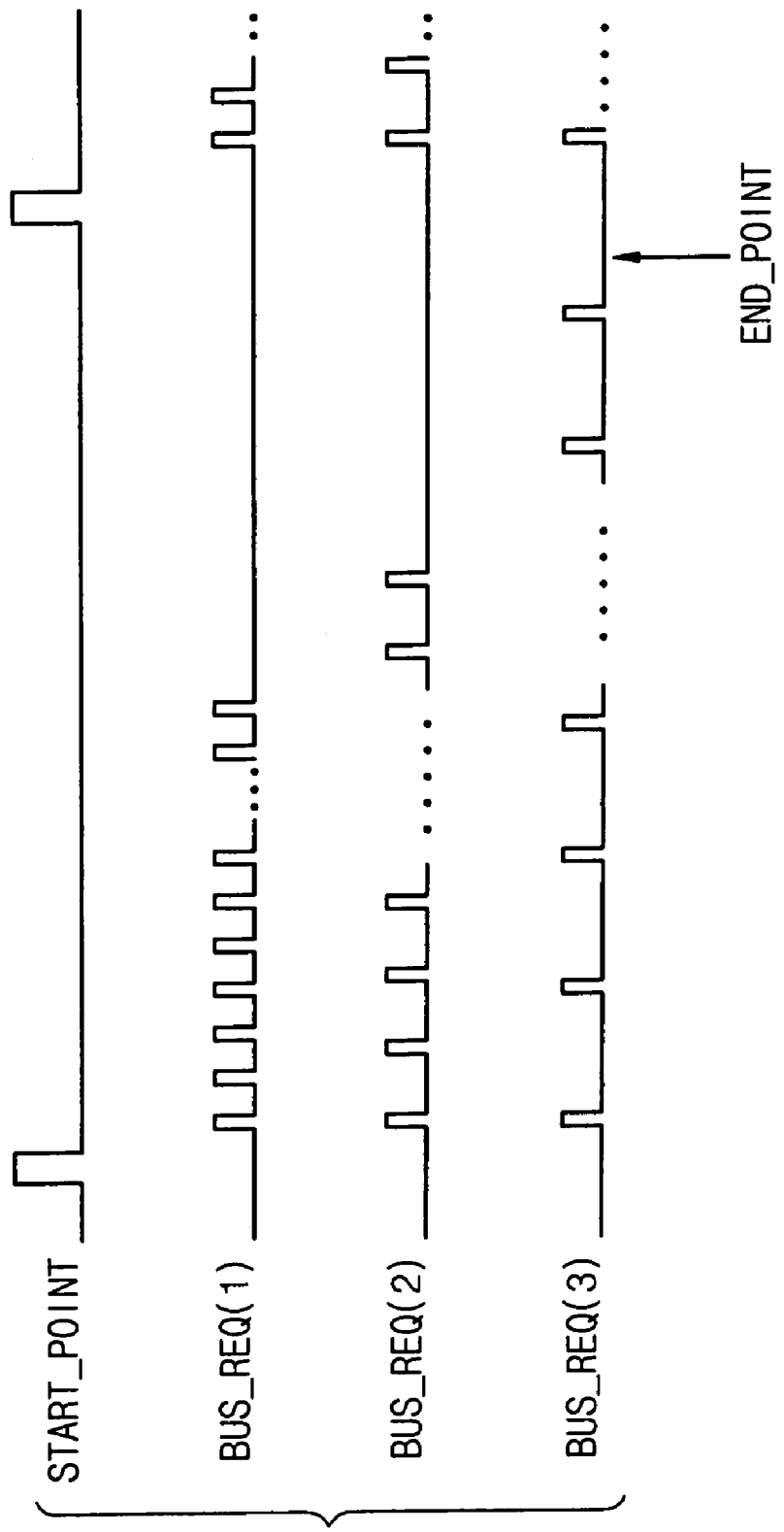

ARRANGEMENT, DEVICE AND METHOD FOR CONTROLLING BUS REQUEST SIGNAL GENERATION

CROSS-REFERENCE TO RELATED APPLICATIONS

This U.S. non-provisional patent application claims priority under 35 U.S.C. § 119 of Korean Patent Application 2004-06295 filed on Jan. 30, 2004, the entire contents of which are hereby incorporated by reference.

BACKGROUND OF THE INVENTION

1. Field of the Invention

The present invention generally relates to a device, arrangement and method capable of effectively controlling bus request signal generation.

2. Description of Related Art

In recent years, a system on chip (hereinafter, referred to as "SOC") has become more complex as integration density of the SOC has increased. SOC development efforts have also intensified in an effort to meet time-to-market needs of customers. Therefore, SOCs are being designed on the basis of a platform, in which the SOC may comprise a number of subsystems. In this case, these subsystems may share a system memory through a bus, i.e., the subsystems in the SOC are connected to the bus, and data is transmitted through the bus between the subsystems.

However, since the data is transmitted through the bus in this sub system organization, the data transmission may be substantially affected by the bandwidth of the bus. In the case of certain high-performance SOCs, substantial amounts of data traffic may limit possible improvements in the SOC performance due to what may be referred to as a 'concentration-on-bus' phenomenon. In other words, the subsystems access the memory of the SOC regardless of the bandwidth limitations of the bus, which may cause frequent intervals where bus traffic increases occur. As a result, entire SOC performance may be degraded.

A method for solving performance degradation due to this concentration-on-bus phenomenon may be to limit an access to the bus by the subsystems, so as to prevent the concentration-on-bus phenomenon. Limiting access may be done by calculating an entire bus bandwidth, and allotting proper (or desired) bus access timing inversely to each subsystem of the SOC. However, this method may be disadvantageous, in that it may not account for numerous possible variations in the average bus bandwidth, which could occur in a complex bus system that performs various functions. This may require that bus access timing be set (or re-calculated) in inordinate number of times, since the bus timing should be calculated with respect to each function. Thus, SOC performance may still suffer where an SOC is used in a complex bus system that performs various functions.

SUMMARY OF THE INVENTION

An exemplary embodiment of the present invention is directed to a device for controlling generation of a bus request signal. The device may include a counter set to an initial periodic value representing an initial bus request period for generating a bus request signal, and a bus request signal generating circuit for generating a bus request signal based on an output value from the counter. A pulse signal generating circuit of the device may determine whether a number of times the bus request signal generating circuit has generated a bus request signal has reached a first threshold value, and may generate a pulse signal based on the determination. The device may include a determining circuit for determining whether a given process period for generating the bus request signal has ended to generate an output signal, in response to the pulse signal. A control circuit of the device may control the counter to adjust the periodic value representing the process period for generating the bus request signal, based on the output signal from the determining circuit.

Another exemplary embodiment of the present invention is directed to a system-on-chip (SOC) arrangement for controlling generation of a bus request signal. The arrangement may include a bus and a plurality of subsystems connected to the bus, each of the plurality of subsystems having a bus request signal generator. At least one of bus request signal generators in one of the subsystems may generate a bus request signal so as to disperse a bus request point in a given process period. Each of the other bus request signal generators of the other subsystems may generate a bus request signal according to a given bus request point.

Another exemplary embodiment of the present invention is directed to a method of controlling generation of a bus request signal. In the method, a bus request signal may be generated according to a periodic value indicating an initial bus request period. A pulse signal may be generated as a function of a number of times that the bus request signal has been generated and a first threshold value. The method may include determining whether a given process period for generating the bus request signal has ended in response to the pulse signal to generate a determination result, and adjusting the periodic value to control the process period of the bus request signal, based on the determination result.

Another exemplary embodiment of the present invention is directed to a device that may include a bus request signal generating circuit for generating a bus request signal under control of a counter, and a pulse signal generating circuit that may generate a pulse signal as a function of a number of times the bus request signal generating circuit has generated a bus request signal and a first threshold value. The device may include a determining circuit for generating a determination result representing whether a given process period for generating the bus request signal has ended, as a function of the pulse signal. A control circuit of the device may control the counter to adjust the process period for generating the bus request signal, based on the determination result.

Another exemplary embodiment of the present invention is directed to a method of controlling generation of a bus request signal. In the method, a bus request signal may be generated in a given process period, and a pulse signal may be generated as a function of a number of times the bus request signal has been generated in the given process period and a first threshold value. The method may include generating a determination result representing whether the given process period for generating the bus request signal has ended as a function of the pulse signal, and controlling the process period based on the determination result.

BRIEF DESCRIPTION OF THE DRAWINGS

The present invention will become more apparent by describing, in detail, exemplary embodiments thereof with reference to the attached drawings, wherein like elements are represented by like reference numerals, which are given by way of illustration only and thus do not limit the exemplary embodiments of the present invention.

FIG. 3 is a timing diagram illustrating operations of a bus signal generator according to an exemplary embodiment of the present invention.

DETAILED DESCRIPTION OF THE EXEMPLARY EMBODIMENTS

Exemplary embodiments of the present invention will be described below in more detail with reference to the accompanying drawings. The present invention may, however, be embodied in different forms and should not be constructed as limited to the exemplary embodiments set forth herein. Rather, these exemplary embodiments are provided so that this disclosure will be thorough and complete, and will fully convey the scope of the invention to those skilled in the art. Like numerals refer to like elements throughout the specification.

Figure 1:
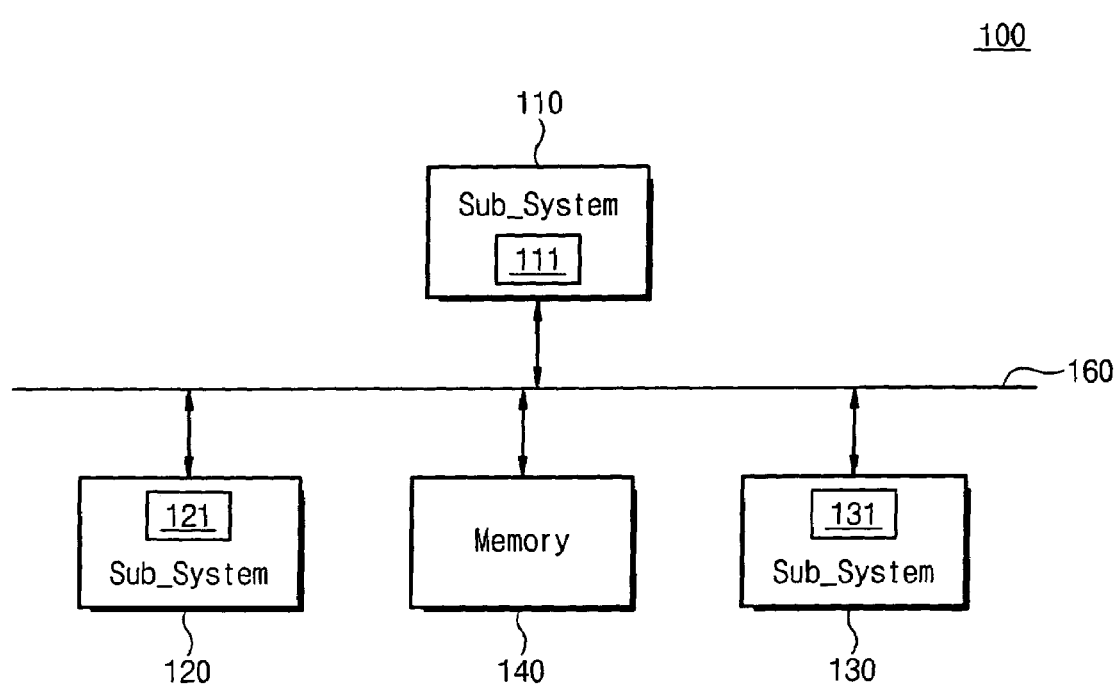
FIG. 1 is a schematic block diagram of a system on chip (SOC) arrangement for controlling bus request signal generation, according to an exemplary embodiment of the present invention.

FIG. 1 is a schematic block diagram of a system on chip (SOC) arrangement for controlling bus request signal generation, according to an exemplary embodiment of the present invention. The SOC arrangement 100 may include a plurality of subsystems, for example, three subsystems 110, 120 and 130 and a memory 140. It is evident to one of ordinary skill in the art that SOC arrangement 100 could include fewer or greater than three subsystems.

The subsystems 110, 120 and 130 may be connected to a common bus 160 so as to share a memory 140. The subsystems 110, 120 and 130 may each include devices known as bus request signal generators, shown generally as blocks 111, 121 and 131 in FIG. 1. A given bus request signal generator may be configured to generate a bus request signal according to a given timing. The given timing may be set in advance, for example.

A bus request signal generator may employ a counter in generating a bus request signal based on a given bus request timing. In the SOC arrangement 100, at least one of the subsystems 110, 120 and 130 may include a device (bus request signal generator) designed to control and/or adjust bus request timing automatically in a given operation interval. For example, a bus request timing may be adjusted (selectively increased or decreased), in an effort to improve system performance by preventing the concentration-on-bus phenomenon.

Figure 2:
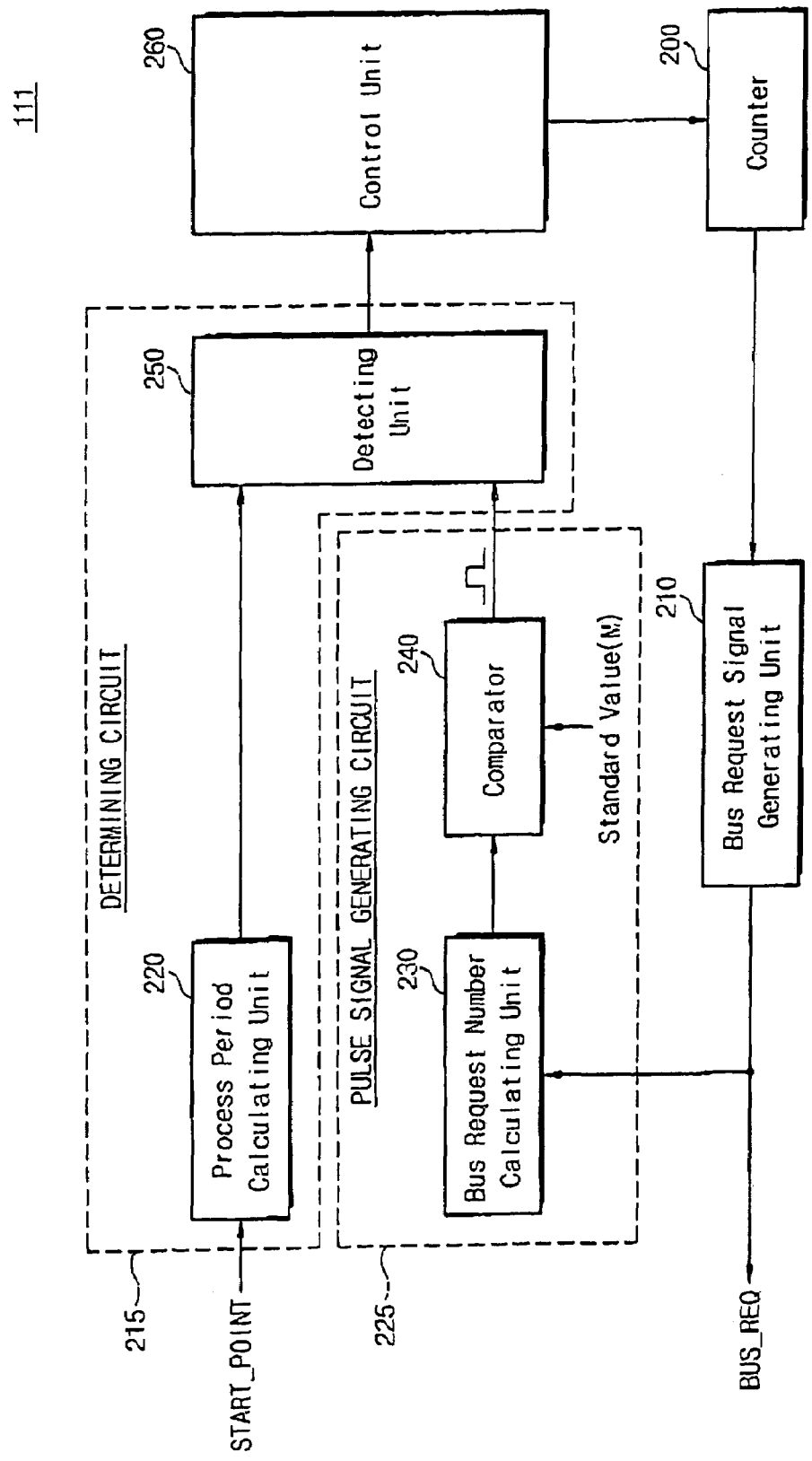
FIG. 2 is a block diagram of an exemplary device for controlling bus request signal generation, in accordance with an exemplary embodiment of the present invention.

FIG. 2 is a block diagram of an exemplary device for controlling bus request signal generation, in accordance with an exemplary embodiment of the present invention. The device may be embodied as a bus request signal generator 111 for a SOC sub system (subsystem 110 in FIG. 1) in accordance with an exemplary embodiment of the present invention. It is evident to those skilled in the art that the exemplary bus request signal generator 111 could be applicable to any of the subsystems in FIG. 1.

Referring to FIG. 2, the bus request signal generator 111 may include a counter 200. The counter 200 may store values (i.e., periodic values) for generating the bus request signal for one or more given period(s) or duration(s).

The bus request signal generator 111 may include a bus request signal generating unit 210 and a control unit 260. The values stored in the counter 200 may be varied under the control of the control unit 260. The bus request signal generating unit 210 may generate a bus request signal, (illustrated as BUS_REQ) in response to the values stored in the counter 200, as shown in FIG. 2. The period (or duration) of the bus request signal BUS_REQ may thus be determined by the values stored in the counter 200 and may be proportional to the size of the value stored in counter 200. For example, if the value stored in (and output from) the counter 200 increases, the period of the bus request signal BUS_REQ may increase in accordance with the increase in the output value. In an example, the period of the bus request signal BUS_REQ may increase by a factor or percentage that equals to increase in the increased value output from counter 200. Similarly, the period of the bus request signal BUS_REQ may decrease proportionately with a decreasing size in the value output from counter 200.

The bus request signal generator 111 may further include a pulse signal generating circuit 225 and a determining circuit 215. In general, the pulse signal generating circuit 225 may generate a pulse signal upon a determination that the number of bus request signals BUS_REQ generated by the bus request signal generating unit 210 has reached a given threshold value, for example. In general, the determining circuit 215 may determine whether a given process interval (also referred to herein as a 'process period') has ended in response to the generated pulse signal.

As shown in FIG. 2, pulse signal generating circuit 225 may further include a bus request number calculating unit 230 and a comparator 240; determining circuit 215 may further include a process period calculating unit 220 and a detecting unit 250. The process period calculating unit 220 may calculate a process period in response to a start signal START_POINT. The process period calculating unit 220 may be embodied as a counter and may be configured to perform a counting operation upon activation of the start signal START_POINT.

The bus request number calculating unit 230 may detect how many times the bus request signal BUS_REQ has been generated since activation of the start signal START_POINT. The comparator 240 may compare an output value from the bus request number calculating unit 230 with the given threshold value (such as a standard value M, where M may be an integer, for example). The threshold value M may represent a process interval in which to generate the pulse signal. For example, when the output value of the bus request number calculating unit 230 equals M indicating the process period or interval, comparator 240 generates the pulse signal.

The detecting unit 250 detects whether an output value of the process period calculating unit 220 has reached a given threshold value (such as a standard value N'), when the pulse signal is generated. The threshold value N may thus indicate an end point of the process interval.

The control unit 260 may control the counter 200 in accordance with the detection result of the detecting unit 250. For example, if the output value of the process period calculating unit 220 has not reached the threshold (i.e., less than N), the control unit 260 may add a value of the counter 200 in response to the output of the detecting unit 250, thus lengthening the period of the bus request signal BUS_REQ. Otherwise, the process period is at the end (output value from process period calculating unit 220 equals N), and the control unit 260 maintains the value of the counter 200 uniformly at the last-increased (previous) value by control of the control unit 260. Thus, once the output value of the process period calculating unit 220 indicates an end point of the process period, the bus request point has been re-modulated.

Of course, a similar control methodology may be employed to reduce the value of the counter 200 (via control unit 260) so as to reduce the period of the bus request signal that is generated by bus request signal generating unit 210, in an effort to efficiently control bus request timing in the sub system 110. Thus, since the method of reducing the process period at which the bus request signal is generated is evident to those skilled in the art, in light of the above discussion, a detailed explanation is omitted for purposes of brevity.

FIG. 3 is a timing diagram of operations for a bus signal generator in accordance with an exemplary embodiment of the present invention. For an understanding of FIG. 3, the bus requests of the subsystems 120 and 130 in FIG. 1 are performed differently at a specific timing. The bus request(s) for the sub system 110 may be performed at any given number of times in a given process period (i.e., at any timing (bus request point) in the process period).

Since the bus requests of the subsystems 120 and 130 are done differently at a specific timing (specific bus request points), bus accesses to the subsystems 120 and 130 are not concentrated and do not contribute to the concentration-on-bus phenomenon. However, since the bus accesses to the sub system 110 may be done at any given number of times (i.e., at any number of bus request points in the process period); this may act to restrict the bus requests of subsystems 120 and 130. That is, the concentration-on-bus phenomenon is present to degrade system performance. This problem can be solved, however, by distributing the bus access within a limitation which does not affect system performance. This is to be explained in more detail below.

First, a periodic value required for generating a bus request signal at specific periods is stored in the counter 200. The bus request signal generating unit 210 generates a bus request signal BUS_REQ in response to the value stored in the counter 200. As described above, the period of the bus request signal BUS_REQ is determined by the value stored in the counter 200. If the value of the counter 200 is uniformly maintained at the initially-set value, the bus request signal BUS_REQ(1) having a period of the initially-set value may be generated, as illustrated in FIG. 3.

Simultaneously, the process period calculating unit 220 performs a count operation when the start signal START_POINT is activated. The bus request number calculating unit 230 determines how many times the bus request signal BUS_REQ is generated, to provide an output value to comparator 240. The comparator 240 compares the output value from the bus request number calculating unit 230 with the threshold value M (indicating the process period) to generate a pulse signal. If the output value of the request number calculating unit 230 is less than M, the comparator 240 does not generate a pulse signal. When the pulse signal is not generated, the detecting unit 250 does not operate and the control unit 260 augments (increments or increases) the value of the counter 200 to a given value (which may be an augmented count value that is preset and/or determined in advance, for example).

Based on to the augmented value, the bus request signal generating unit 210 generates the bus request signal BUS_REQ periodically, so that a bus request signal BUS_REQ(2) has the increased process period of the augmented value, as shown in FIG. 3. The bus request number calculating unit 230 again determines the number of times the bus request signal BUS_REQ(2) is generated to generate the output value to the comparator 240. The comparator 240 compares the revised output value to the threshold value M to generate a pulse signal. Since in this example the output value from bus request calculating unit 230 is still less than M, the comparator 240 does not generate the pulse signal, and since the pulse signal is still not generated, the detecting unit 250 does not operate. As a result, the control unit 260 again increases a value of the counter 200 to another given augmented value (which may be a known or preset value determined in advance), and a bus request signal is generated by bus request signal generating unit 210 at an even greater process period, as shown by BUS_REQ(3) in FIG. 3, for example.

Once the output value of the bus request number calculating unit 230 equals M (i.e., the bus request has been generated M times), the pulse signal is generated. Since the pulse signal has now been generated, the detecting unit 250 detects whether the output value of the process period calculating unit 220 indicates an end point of the process period. If the output value of the process period calculating unit 220 indicates an end point of the process period (i.e., the output value equals the threshold N), the value of the counter 200 may be maintained uniformly to the last-increased (previous) value by control of the control unit 260. That is, once the output value of the process period calculating unit 220 indicates an end point of the process period, the bus request point may be re-modulated as illustrated above to disperse bus access timing, in an effort to avoid the effects that the concentration-on-bus phenomenon has on system performance.

Therefore, the exemplary methodology, system and bus request signal generator may effectively control bus request timing to disperse bus access timing, such that the concentration-on-bus phenomenon of the system on chip can be reduced. This may lead to improved performance of the system on chip or circuits including SOC subsystems, for example.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed is:

1. A device for controlling generation of a bus request signal, comprising:
   a counter set to an initial periodic value representing an initial bus request period for generating a bus request signal;
   a bus request signal generating circuit for generating a bus request signal based on an output value from the counter;
   a pulse signal generating circuit for determining whether a number of times the bus request signal generating circuit has generated a bus request signal has reached a first threshold value, and for generating a pulse signal based on the determination;
   a determining circuit for determining whether a given process period for generating the bus request signal has ended to generate an output signal, in response to the pulse signal; and
   a control circuit for controlling the counter to adjust the periodic value representing the process period for generating the bus request signal, based on the output signal from the determining circuit.

2. The device of claim 1, wherein the control circuit is adapted to control the counter so as to increase, decrease or maintain the periodic value, based on receiving the output signal, or a lack thereof, from the determining circuit.

3. The device of claim 1, wherein the pulse signal generating circuit includes:
   a bus request number calculating unit for calculating the number of times the bus request signal generating circuit generates the bus request signal to generate an output value; and a comparator for generating the pulse signal once the output value equals the first threshold value.

4. The device of claim 1, wherein the determining circuit includes:
a process period calculating unit for performing a count operation in response to a start signal indicating a start of the process period for generating the bus request signal, to generate an output value; and
a detecting unit for detecting whether the output value from the process period calculating unit has reached a second threshold value indicating an end point of the process period, when the pulse signal is activated.

5. A system-on-chip (SOC) arrangement for controlling generation of a bus request signal, comprising:
a bus; and
a plurality of subsystems connected to the bus, each of the plurality of subsystems having a bus request signal generator,
wherein at least one of the bus request signal generators in one of the subsystems generates a bus request signal so as to disperse a bus request point in a given process period, and each of the other bus request signal generators of the other subsystems generate a bus request signal according to the given bus request point.

6. The arrangement of claim 5, wherein the at least one bus request signal generator in the one subsystem includes:
a counter set to an initial periodic value representing an initial bus request period for generating a bus request signal;
a bus request signal generating circuit for generating a bus request signal based on an output value from the counter;
a pulse signal generating circuit for determining whether a number of times the bus request signal generating circuit has generated a bus request signal has reached a first threshold value, and for generating a pulse signal based on the determination;
a determining circuit for determining whether a given process period for generating the bus request signal has ended to generate an output signal, in response to the pulse signal; and
a control circuit for controlling the counter to adjust the periodic value representing the process period for generating the bus request signal, based on an output signal from the determining circuit.

7. The arrangement of claim 5, wherein the bus request signal generators of the plurality of subsystems include counters set to different periodic values.

8. The arrangement of claim 6, wherein the control circuit is adapted to control the counter so as to increase, decrease or maintain the periodic value, based on receiving the output signal, or a lack thereof, from the determining circuit.

9. The arrangement of claim 6, wherein the pulse signal generating circuit includes:
a bus request number calculating unit for calculating the number of times the bus request signal generating circuit has generated the bus request signal to generate an output value; and
a comparator for generating the pulse signal when the output value equals the first threshold value.

10. The arrangement of claim 6, wherein the determining circuit includes:
a process period calculating unit for performing a count operation in response to a start signal indicating a start of the process period for generating the bus request signal, to generate an output value; and
a detecting unit for detecting whether the output value of the process period calculating unit has reached a second threshold value indicating an end point of the process period, when the pulse signal is activated.

11. A method of controlling generation of a bus request signal, comprising:
generating a bus request signal according to a periodic value indicating an initial bus request period;
generating a pulse signal as a function of a number of times that the bus request signal has been generated and a first threshold value;
determining whether a given process period for generating the bus request signal has ended in response to the pulse signal to generate a determination result; and
adjusting the periodic value to control the process period of the bus request signal, based on the determination result.

12. The method of claim 11, wherein adjusting includes selectively increasing, decreasing or maintaining the periodic value, based on the determination result.

13. The method of claim 11, wherein generating the pulse signal includes:
calculating a number of times that the bus request signal has been generated to generate an output value; and
generating the pulse signal when the output value equals the first threshold value.

14. The method of claim 11, wherein determining includes:
performing a count operation in response to a start signal indicating a start of the process period to generate an output value; and
detecting whether the output value has reached a second threshold value indicating an end point of the process period, when the pulse signal is activated.

15. A device controlling generation of a bus request signal in accordance with the method of claim 11.

16. A device, comprising:
a bus request signal generating circuit for generating a bus request signal under control of a counter;
a pulse signal generating circuit for generating a pulse signal as a function of a number of times the bus request signal generating circuit has generated a bus request signal and a first threshold value;
a determining circuit for generating a determination result representing whether a given process period for generating the bus request signal has ended, as a function of the pulse signal; and
a control circuit for controlling the counter to adjust the process period for generating the bus request signal, based on the determination result.

17. The device of claim 16, wherein the control circuit is adapted to control the counter so as to increase, decrease or maintain the process period, based on receiving the determination result, or a lack thereof, from the determining circuit.

18. The device of claim 16, wherein the pulse signal generating circuit includes:
a bus request number calculating unit for calculating the number of times the bus request signal generating circuit generates the bus request signal to generate an output value; and
a comparator for generating the pulse signal once the output value equals the first threshold value.

19. The device of claim 16, wherein the determining circuit includes:
a process period calculating unit for performing a count operation in response to a start signal indicating a start of the process period for generating the bus request signal, to generate an output value; and
a detecting unit for detecting whether the output value from the process period calculating unit has reached a second threshold value indicating an end point of the process period, when the pulse signal is activated.

20. A method of controlling generation of a bus request signal, comprising:
   generating a bus request signal in a given process period;
   generating a pulse signal as a function of a number of times the bus request signal has been generated in the given process period and a first threshold value;
   generating a determination result representing whether the given process period for generating the bus request signal has ended as a function of the pulse signal; and
   controlling the process period for generating the bus request signal based on the determination result.

21. The method of claim 20, wherein controlling includes selectively increasing, decreasing or maintaining the process period, based on the determination result.

22. The method of claim 20, wherein generating the pulse signal includes:
   calculating a number of times that the bus request signal has been generated to generate an output value; and
   generating the pulse signal when the output value equals the first threshold value.

23. The method of claim 20, wherein determining includes:
   performing a count operation in response to a start signal indicating a start of the process period to generate an output value; and
   detecting whether the output value has reached a second threshold value indicating an end point of the process period, when the pulse signal is activated.

24. A device controlling generation of a bus request signal in accordance with the method of claim 20.

25. A system-on-chip (SOC) arrangement for controlling generation of a bus request signal, comprising:
   a bus; and
   a plurality of subsystems connected to the bus, each of the plurality of subsystems having a bus request signal generator,
   wherein at least one of the bus request signal generators in one of the subsystems controls generation of a bus signal in accordance with the method of claim 11, and each of the other bus request signal generators of the other subsystems generate a bus request signal according to a given bus request point.

26. A system-on-chip (SOC) arrangement for controlling generation of a bus request signal, comprising:
   a bus; and
   a plurality of subsystems connected to the bus, each of the plurality of subsystems having a bus request signal generator,
   wherein at least one of the bus request signal generators in one of the subsystems controls generation of a bus signal in accordance with the method of claim 20, and each of the other bus request signal generators of the other subsystems generate a bus request signal according to a given bus request point.

27. A system-on-chip (SOC) arrangement for controlling generation of a bus request signal, comprising:
   a bus; and
   a plurality of subsystems connected to the bus, each of the plurality of subsystems having a bus request signal generator,
   wherein at least one of the bus request signal generators in one of the subsystems includes the device of claim 1 to generate a bus request signal so as to disperse a bus request point in a given process period, and each of the other bus request signal generators of the other subsystems generate a bus request signal according to a given bus request point.

28. A system-on-chip (SOC) arrangement for controlling generation of a bus request signal, comprising:
   a bus; and
   a plurality of subsystems connected to the bus, each of the plurality of subsystems having a bus request signal generator, wherein at least one of the bus request signal generators in one of the subsystems includes the device of claim 16 to generate a bus request signal so as to disperse a bus request point in a given process period, and each of the other bus request signal generators of the other subsystems generate a bus request signal according to a given bus request point.

* * * * *